United States Patent
Kosloske et al.

(10) Patent No.: US 12,254,495 B1
(45) Date of Patent: *Mar. 18, 2025

(54) COMPUTER STORE OF POSTS FOR POSTING TO USER WEBPAGES OF SOCIAL NETWORKING SERVICES FROM A CONTENT PROVIDER FOR EXPANDING COMMERCIAL ADVERTISING AT THE USER WEBPAGES

(71) Applicant: KILLER BEE ENTERPRISES, LLC, Fountain Hills, AZ (US)

(72) Inventors: Cheryl C. Kosloske, Fountain Hills, AZ (US); James D. Torgerson, Fountain Hills, AZ (US); William C. Johnson, Fountain Hills, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/412,869

(22) Filed: Jan. 15, 2024

Related U.S. Application Data

(63) Continuation of application No. 17/145,708, filed on Jan. 11, 2021, now Pat. No. 11,900,420, which is a continuation of application No. 16/582,382, filed on Sep. 25, 2019, now Pat. No. 10,922,723, which is a continuation of application No. 14/661,880, filed on Mar. 18, 2015, now Pat. No. 10,430,834.

(51) Int. Cl.
*G06Q 30/0251* (2023.01)
*G06Q 50/00* (2012.01)

(52) U.S. Cl.
CPC ......... *G06Q 30/0269* (2013.01); *G06Q 50/01* (2013.01)

(58) Field of Classification Search
CPC .......................... G06Q 30/0269; G06Q 50/01
See application file for complete search history.

(56) References Cited

U.S. PATENT DOCUMENTS

| | | |
|---|---|---|
| 6,182,229 B1 | 1/2001 | Nielsen |
| 6,725,269 B1 | 4/2004 | Megiddo |
| 7,103,912 B2 | 9/2006 | Xia et al. |
| 7,136,490 B2 | 11/2006 | Martinez et al. |
| 7,650,632 B2 | 1/2010 | Yantzi |
| 8,364,713 B2 | 1/2013 | Pollard |
| 8,484,241 B2 | 7/2013 | Bouse et al. |
| 2003/0041240 A1 | 2/2003 | Roskind et al. |
| 2008/0288338 A1 | 11/2008 | Wiseman et al. |
| 2010/0131362 A1 | 5/2010 | Liang et al. |

(Continued)

*Primary Examiner* — E Carvalho
(74) *Attorney, Agent, or Firm* — Parsons & Goltry, PLLC; Michael W. Goltry; Robert A. Parsons

(57) ABSTRACT

A system includes a content provider serving a first user webpage that displays an external posting link associated with a computer store and a second user webpage of a social networking service. The computer store contains posts each associated with a post select control. A computer server at the content provider is coupled to the computer store and for each of the posts is programmed to receive from a web browser of a computer user a signal indicating activation of the post select control of a selected one of the posts displayed by the first user webpage, automatically link the selected one of the posts to the external posting link, receive from the web browser of the computer user a signal indicating activation of the external posting link, and automatically issue the selected one of the posts to the second user webpage for posting thereon.

8 Claims, 10 Drawing Sheets

(56) References Cited

U.S. PATENT DOCUMENTS

| | | |
|---|---|---|
| 2010/0241652 A1 | 9/2010 | Fasihuddin et al. |
| 2011/0218858 A1* | 9/2011 | Christensen ....... G06Q 30/0253 |
| | | 705/14.51 |
| 2013/0030909 A1* | 1/2013 | Shih ................... G06Q 30/0277 |
| | | 705/14.48 |
| 2013/0117107 A1 | 5/2013 | Evans |
| 2013/0226710 A1 | 8/2013 | Plut |
| 2014/0122201 A1* | 5/2014 | Johnson ............. G06Q 30/0257 |
| | | 705/14.19 |
| 2014/0137220 A1 | 5/2014 | Niemela |
| 2014/0157377 A1 | 6/2014 | Kiryakos et al. |

* cited by examiner

| KEYWORDS | CATEGORIES | GENERAL ⌄ |
|---|---|---|
| THERE IS ALWAYS ENOUGH TIME IN A BUSY DAY TO SAY "THANK YOU" TO ALL OF OUR CUSTOMERS. EXPECT CUSTOMER APPRECIATION EVERY DAY. | | ☐☐☐ ⇧ 0 |
| WHAT IS THE DEFINITION OF SERVICE? ...(BUSINESS NAME) BELIEVES THAT THE CUSTOMER IS ALWAYS RIGHT! | | ☐☐☐ ⇧ 0 |
| DO YOU REMEMBER WHEN THE WORD "TWEET" WAS A NOISE FROM A BIRD AND A "POST" WAS SOMETHING YOU BACKED INTO IN A CROWDED PARKING LOT? THE GOOD 'OL DAYS ARE STILL CELEBRATED AT (BUSINESS NAME) | | ☐☐☐ ⇧ 0 |
| EXCEPTIONAL SERVICE IS THE "NORM" AT (BUSINESS NAME) | | ☐☐☐ ⇧ 0 |
| SHOP TILL YOU _____ . FILL IN THE BLANK HERE _____ | | ☐☐☐ ⇧ 0 |
| WHEN WAS THE LAST TIME YOU _____ , _____ . FILL IN THE BLANK | | ☐☐☐ ⇧ 0 |
| WHAT DEFINES EXCEPTIONAL? ONE THOUGHT ...(BUSINESS NAME). LET US TREAT YOU LIKE ROYALTY! | | ☐☐☐ ⇧ 0 |
| WHAT IS YOUR DEFINITION OF A PERFECT PAIR? (BUSINESS NAME) IS SEEING DOUBLE. CHECK OUT ALL THE OPTIONS! | | ☐☐☐ ⇧ 0 |
| THE COUNT DOWN IS ON. THREE-TWO-ONE-DIVE- INTO LUXURY! LIFE IS SHORT. | | ☐☐☐ ⇧ 0 |
| WHERE WERE YOU WHEN NEIL ARMSTRONG STEPPED FOOT ON THE MOON? | | ☐☐☐ ⇧ 0 |

FIG. 3

| CATEGORIES | | GENERAL ⌄ |
|---|---|---|
| KEYWORDS | | |
| THERE IS ALWAYS ENOUGH TIME IN A BUSY DAY TO SAY "THANK YOU" TO ALL OF OUR CUSTOMERS. EXPECT CUSTOMER | | ☐ ⇧ 0 |
| WHAT IS THE DEFINITION OF SERVICE? ...(BUSINESS NAME) BELIEVES THAT THE CUSTOMER IS ALWAYS RIGHT! | GENERAL QUOTES SPIRITUAL RESTAURANT | ☐ ⇧ 0 |
| DO YOU REMEMBER WHEN THE WORD "TWEET" WAS A NOISE FROM A BIRD AND A "POST" WAS SOMETHING YOU BACKING LOT? THE GOOD 'OL DAYS ARE STILL CELEBRATED AT (BUSINESS NAME). | CLUB AUTOMOTIVE | ☐ ⇧ 0 |
| EXCEPTIONAL SERVICE IS THE "NORM" AT (BUSINESS NAME) | SERVICE RETAIL | ☐ ⇧ 0 |
| SHOP TILL YOU _____. FILL IN THE BLANK HERE _____ | TRANSPORTATION CONSTRUCTION | ☐ ⇧ 0 |
| WHEN WAS THE LAST TIME YOU _____, _____. FILL IN THE BLANK | REAL ESTATE MANUFACTURING | ☐ ⇧ 0 |
| WHAT DEFINES EXCEPTIONAL? ONE THOUGHT ...(BUSINESS NAME). LET US TREAT YOU LIKE ROYALTY! | | ☐ ⇧ 0 |
| WHAT IS YOUR DEFINITION OF A PERFECT PAIR? (BUSINESS NAME) IS SEEING DOUBLE. CHECK OUT ALL THE OPTIONS! | | ☐ ⇧ 0 |
| THE COUNT DOWN IS ON. THREE-TWO-ONE-DIVE-- INTO LUXURY! LIFE IS SHORT. | | ☐ ⇧ 0 |
| WHERE WERE YOU WHEN NEIL ARMSTRONG STEPPED FOOT ON THE MOON? | | ☐ ⇧ 0 |

FIG. 4

| CATEGORIES | | RESTAURANT ▾ |
|---|---|---|
| KEYWORDS | | |
| WHAT DOES FREEDOM MEAN TO YOU? ....THE RIGHT TO CONSUME AS MUCH AS YOU WANT? | GENERAL | ☐ ☐ ⇧ 0 |
| EXPERIENCE THE "BEST OF THE BEST" AT (BUSINESS NAME) | QUOTES SPIRITUAL | ☐ ☐ ⇧ 0 |
| CELEBRATE YOUR BIRTHDAY AT (BUSINESS NAME) AND, RECEIVE A SPECIAL GIFT! | RESTAURANT CLUB | ☐ ☐ ⇧ 0 |
| (BUSINESS NAME) IS PUTTING THE "THIRSTY" BACK IN THURSDAYS!  CHECK US OUT! | AUTOMOTIVE SERVICE | ☐ ☐ ⇧ 0 |
| WHAT HAPPENS AT (BUSINESS NAME) STAYS AT (BUSINESS NAME)! | RETAIL TRANSPORTATION | ☐ ⇧ 0 |
| WHAT HAPPENS WHEN THE WORD "BORED" SHOWS UP IN A CONVERSATION? (BUSINESS NAME) CAN HELP WITH THAT. | CONSTRUCTION REAL ESTATE | ☐ ☐ ⇧ 0 |
| TODAY IS THE FIRST DAY OF THE REST OF YOUR LIFE... MAKE IT A SPECIAL ONE AT (BUSINESS NAME) | MANUFACTURING | ☐ ☐ ⇧ 0 |
| (BUSINESS NAME) PUTS NEW MEANING TO THE TERM "FARM TO TABLE".  CHECK US OUT TODAY! | | ☐ ☐ ⇧ 0 |
| READY... SET... PARTY!!!!! | | ☐ ☐ ⇧ 0 |
| EVERY DAY IS "WINE DOWN TODAY" AT (BUSINESS NAME), YOUR FAVORITE WINE IS WAITING FOR YOU! | "EW" EVERY TIME YOU VISIT US. | ☐ ☐ ⇧ 0 |

*FIG. 5*

| KEYWORDS | CATEGORIES | CLUB ▾ | | |
|---|---|---|---|---|
| (BUSINESS NAME) IS PUTTING "THIRSTY BACK IN THURSDAYS! CHECK US OUT! | GENERAL | | ☐ ⇧ ○ | |
| WHAT HAPPENS AT (BUSINESS NAME) STAYS AT (BUSINESS NAME) | QUOTES | | ☐ ⇧ ○ | |
| WHAT HAPPENS WHEN THE WORD "BORED" SHOWS UP IN A CONVERSATION? (BUSINESS NAME) CAN HELP WITH THAT | SPIRITUAL RESTAURANT CLUB | EW" EVERY TIME YOU VISIT US. | ☐ ⇧ ○ | |
| TODAY IS THE FIRST DAY OF THE REST OF YOUR LIFE... MAKE IT A SPECIAL ONE AT (BUSINESS NAME) | AUTOMOTIVE SERVICE | | ☐ ⇧ ○ | |
| READY... SET... PARTY!!!!!! | RETAIL | | ☐ ⇧ ○ | |
| GUESS WHAT THE NEW BREWMASTER IS WORKING ON? (BUSINESS NAME) WILL ALLOW YOU TO NAME A NEW BREW. P | TRANSPORTATION CONSTRUCTION | | ☐ ⇧ ○ | |
| MUSIC. FOOD. FUN ...(BUSINESS NAME) HAS ALL THREE ON THE AGENDA! | REAL ESTATE MANUFACTURING | | ☐ ⇧ ○ | |
| COME TO (BUSINESS NAME) AND FEEL WHAT IT'S LIKE TO BE SURROUNDED BY SPORTS! | | | ☐ ⇧ ○ | |
| EARLY TO BED. EARLY TO RISE. MAKES YOU HEALTHY, WEALTHY AND WISE. WHAT HAPPENS WHEN THE PARTY AT (BUSINESS NAME) STARTS AT 10:00 PM? MAGIC. | | | ☐ ⇧ ○ | |
| WHAT HAPPENS WHEN THE TEMPERATURE RISES? (BUSINESS NAME) STARTS CHILLING THE DRINKS! | | | ☐ ⇧ ○ | |

FIG. 8

| CATEGORIES | | AUTOMOTIVE ⌄ |
|---|---|---|
| KEYWORDS | | |
| (BUSINESS NAME) HAS THE MOST EXTENSIVE GUARANTEE IN THE INDUSTRY! BAR NONE! | GENERAL<br>QUOTES<br>SPIRITUAL<br>RESTAURANT<br>CLUB<br>AUTOMOTIVE<br>SERVICE<br>RETAIL<br>TRANSPORTATION<br>CONSTRUCTION<br>REAL ESTATE<br>MANUFACTURING | ☐ ☐ ☐ ⇧ 0 |
| INDULGE YOUR FANTASIES AT (BUSINESS NAME) | | ☐ ☐ ☐ ⇧ 0 |
| WHEN YOU REACH YOUR PINNACLE. TREAT YOURSELF AT (BUSINESS NAME) | | ☐ ☐ ☐ ⇧ 0 |
| BURY YOURSELF IN LUXURY. (BUSINESS NAME) BELIEVES YOU HAVE EARNED IT! | | ☐ ☐ ☐ ⇧ 0 |
| (BUSINESS NAME), WHERE NEGOTIATIONS ARE FUN! | | ☐ ☐ ☐ ⇧ 0 |
| NAME YOUR PRICE AT (BUSINESS NAME)! | | ☐ ☐ ☐ ⇧ 0 |
| (BUSINESS NAME),WHERE DECOMPRESSION HAPPENS | | ☐ ☐ ☐ ⇧ 0 |
| WHAT SMELLS BETTER THAN A NEW CAR? | | ☐ ☐ ☐ ⇧ 0 |
| (BUSINESS NAME) WHERE DREAMS COME TRUE! | | ☐ ☐ ☐ ⇧ 0 |
| (BUSINESS NAME), WHERE DREAMS BECOME REALITY | | ☐ ☐ ☐ ⇧ 0 |

*FIG. 9*

| KEYWORDS | CATEGORIES | RETAIL ⌄ | | | |
|---|---|---|---|---|---|
| BURY YOURSELF IN LUXURY... (BUSINESS NAME) BELIEVES YOU HAVE EARNED IT! | GENERAL | ☐☐☐ ☆ 0 | | | |
| (BUSINESS NAME). WHERE DREAMS BECOME REALITY. | QUOTES | | | | |
| WHAT SMELLS BETTER THAN A NEW CAR? | SPIRITUAL | ☐☐☐ ☆ 0 | | | |
| PROTECT YOUR LOVED ONES WITH (BUSINESS NAME). | RESTAURANT | ☐☐☐ ☆ 0 | | | |
| (BUSINESS NAME) HAS 50 SHADES... OF EVERY COLOR. THE CHOICES ABOUND! | CLUB AUTOMOTIVE SERVICE | ☐☐☐ ☆ 0 | | | |
| CLEAR, CONCISE, PROFESSIONAL, COURTEOUS... (BUSINESS NAME), NEED I SAY MORE? | RETAIL TRANSPORTATION | ☐☐☐ ☆ 0 | | | |
| WHY WAIT? (BUSINESS NAME) IS READY TO HELP! | CONSTRUCTION REAL ESTATE | ☐☐☐ ☆ 0 | | | |
| (BUSINESS NAME), THE ULTIMATE TRUNK SHOW! | MANUFACTURING | ☐☐☐ ☆ 0 | | | |
| VALUE AND BEST IN CLASS... NEED I SAY MORE? | | ☐☐☐ ☆ 0 | | | |
| AHHHHH... NOTHING LIKE RETAIL THERAPY... | | ☐☐☐ ☆ 0 | | | |

FIG. 10

COMPUTER STORE OF POSTS FOR POSTING TO USER WEBPAGES OF SOCIAL NETWORKING SERVICES FROM A CONTENT PROVIDER FOR EXPANDING COMMERCIAL ADVERTISING AT THE USER WEBPAGES

FIELD OF THE INVENTION

The present invention relates to social networking services and, more particularly, to systems and methods for posting content to user webpages of social networking services.

BACKGROUND OF THE INVENTION

Starting a business is an achievement, but maintaining one is the larger challenge. Standard challenges that face every business owner include building a brand, accessing capital, developing an infrastructure of people and equipment, and advertising and marketing, especially online advertising and marketing, marketing and advertising that uses the Internet to deliver promotional marketing messages to consumers. Over 1 billion people worldwide surf the Internet every day. As a consequence, businesses throughout the world engage in online advertising as a means to showcase products and services.

Online advertising includes email marketing, search engine marketing, display advertising, such as web banner advertising, mobile advertising, and social media advertising. Social media advertising uses social networking services, platforms to build social networks or social relations among people who share interests, activities, backgrounds, or real-life connections through user pages, for advertising campaigns via posting, placing messages on a website. Although social networking services offer paid advertising opportunities, business owners routinely establish user pages through selected social networking services and post content to the user pages that serves a commercial purpose of creating interest by prospective customers in the products, services, expertise, knowledge, or qualifications of the given business, for the commercial opportunity of prospective customers purchasing products or services from the business owner.

The use by businesses of user pages of social networking services for posting content having a commercial purpose for creating a commercial opportunity for the businesses associated with the user pages presents a problem of creating and posting content to the user webpages. It is one thing to have a social network user page, and another thing entirely to post content to the user page. Although many businesses create social network user pages with the good intentions of posting content on a regular basis for creating commercial impressions in users accessing those webpages, content posting is routinely inconsistent, inappropriate, or not made at all. Although content posting to social network user webpages presents a unique advertising opportunity for business owners, actually creating and posting content has proven especially challenging, in that it is either not done, not done consistently, or done ineffectively. This problem of posting online advertising posts to webpages of social networking services, a problem specifically arising in the realm of computer networks, is due to a variety of reasons, which can include the lack of skill or time on the part of businesses to create and post content, the lack of capital to hire a professional to create and post content, and the lack of the skill or ability to create and post content. Businesses often delegate "social media updating", i.e. posting content to webpages of social networking services, including all creative messaging, photography, and customer communications, to an employee. However, employee unreliability, employee turnover, and the lack of employee training and supervision routinely results in stagnant, inconsistent, and ineffective content creating and posting. When the business owner hires an outside social media firm, often at considerable expense, to perform the social media updating on behalf of the business, similar issues routinely arise. In each scenario, relinquishing control of a social media advertising campaign to an employee or a third party is risky to a business, and can cause the business to lose its competitive advantage, and to capitalize on a powerful marking tool, online social media advertising.

SUMMARY OF THE INVENTION

According to the principle of the invention, a social media content posting system includes a content provider serving a first user webpage, and a computer store containing posts, each associated with a post select control, for being posted to a second user webpage of a social networking service. The first user webpage displays an external posting link associated with the computer store and the second user webpage. A computer server at the content provider is coupled to the computer store and for each of the posts the computer server is programmed to receive from a web browser of a computer user a signal indicating activation of the post select control of a selected one of the posts displayed by the first user webpage, automatically link the selected one of the posts to the external posting link, receive from the web browser of the computer user a signal indicating activation of the external posting link, and automatically issue the selected one of the posts to the second user webpage for posting thereon. The first user webpage is different from the second user webpage. Each one of the posts serves a commercial purpose for creating a commercial opportunity.

A social media content posting system includes a content provider serving a first user webpage, and a computer store containing posts, each associated with a post select control, for being posted to second user webpages of respective social networking services. The first user webpage is different from each of the second user webpages, the second user webpages are different from each other, and the social networking services are different from each other. The first user webpage displays an external posting link associated with the computer store and the second user webpages. A computer server at the content provider is coupled to the computer store and for each of the posts is programmed to receive from a web browser of a computer user a signal indicating activation of the post select control of a selected one of the posts displayed by the first user webpage, automatically link the selected one of the posts to the external posting link, receive from the web browser of the computer user a signal indicating activation of the external posting link, and automatically issue the selected one of the posts to the second user webpages for posting thereon. Each one of the post serves a commercial purpose for creating a commercial opportunity.

BRIEF DESCRIPTION OF THE DRAWINGS

Referring to the drawings:

FIGS. 2-10 are webpage screen captures illustrating procedures of a content posting process.

DETAILED DESCRIPTION

An online content library includes posts for being posted to user webpages of social networking services, online platforms to build social networks or social relations among people who share interests, activities, backgrounds, or real-life connections through user pages. Each one of the posts serves a commercial purpose, for creating a commercial opportunity both for visitors visiting the user webpages of the social networking services from visitor computers, and for the users of the user webpages of the social networking services. There are at least two different webpages for each user of a potentially vast number of users, a first user webpage of a content provider, and at least one second user webpage of a social networking service. The content provider serves the first user webpage, and the social networking service serves the second user webpage. The first user webpage is a content posting webpage, and the second user webpage is a social networking user webpage. A computer store, a digital computer database, contains the posts. The posts can be categorized, such as by subject matter or field as examples. Each post is associated with a post select control, an internal link of the first user webpage. The first user webpage displays an external posting link associated with the computer store and the second user webpage. A computer server at the content provider is coupled to the computer store and is programmed to receive from a web browser of a computer user signals to browse through the posts. For each of the posts the computer server is programmed to receive from a web browser of a computer user, a visitor user using a visiting computer, a signal indicating activation of the post select control of a selected one of the posts displayed by the first user webpage, automatically link the selected one of the posts to the external posting link, receive from the web browser of the computer user a signal indicating activation of the external posting link, and automatically issue the selected one of the posts to the second user webpage for posting thereon.

Figure 1:
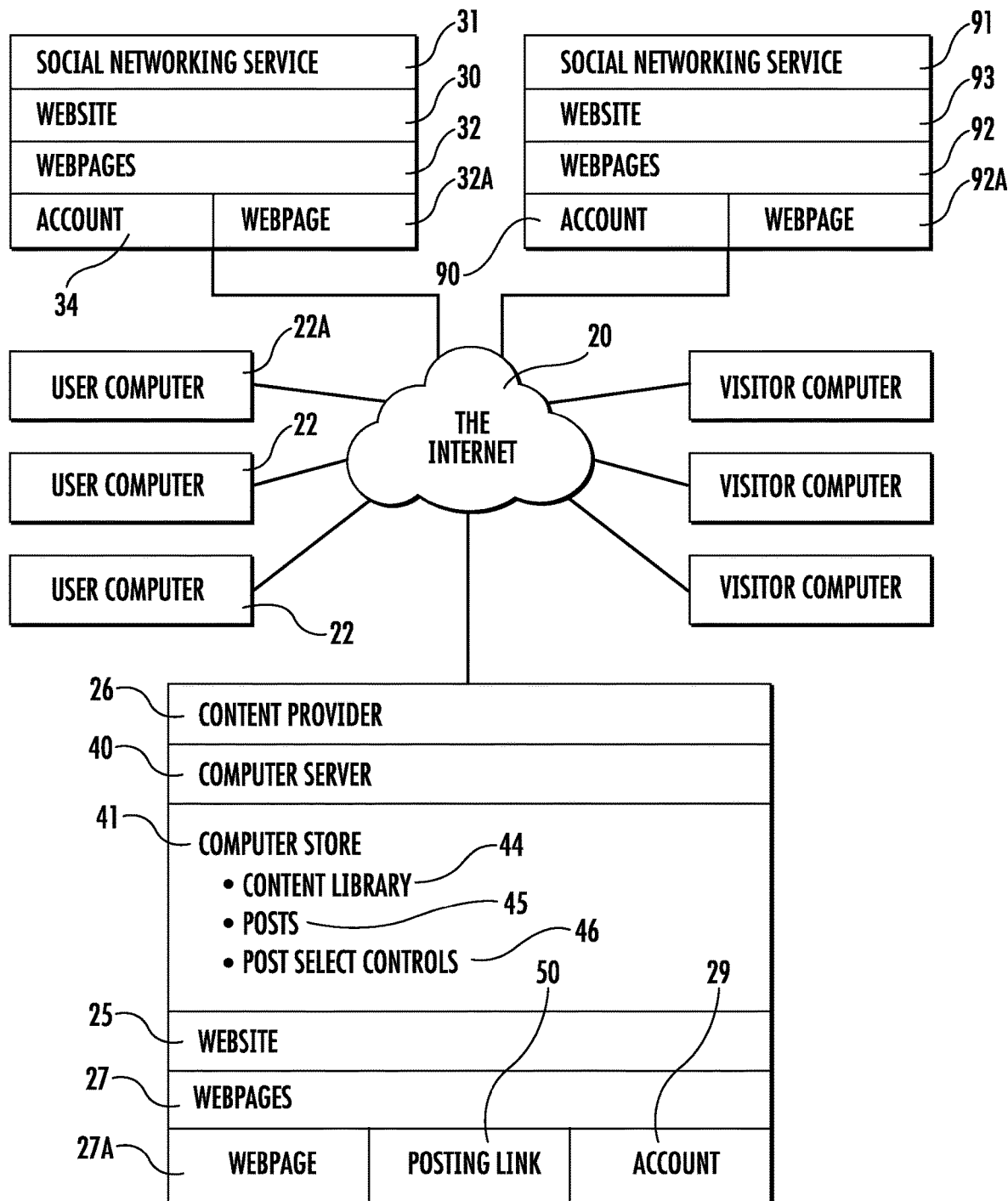
FIG. 1 depicts a hardware and software architecture implementing the present invention.

Turning now to the drawings, in which like reference characters indicate corresponding elements throughout the several views, attention is first directed to FIG. 1 illustrating a system including Internet 20 connecting user computers 22 to websites, which include website 25 of content provider 26, and website 30 of social networking service 31. Content provider 26 and social networking service 31 are third parties with respect to each other. A potentially vast number of user computers 22 can be connected to websites 25 and 30 via Internet 20 in the use of the systems and methods herein disclosed. Website 25, group of user webpages 27, is different from website 30, group of user webpages 32. Content provider 26 is an online platform to access and send posts from user webpages 27 of website 25 of content provider 26 to user webpages 32 of website 30 of social networking service 31, an online platform to build social networks or social relations among people who share interests, activities, backgrounds, or real-life connections through user webpages 32.

The party associated with each user computer 22 is a business user, e.g. a person, partnership, or corporation engaged in commerce, manufacturing, or a service. Each business user has a content posting account, accessible via a respective one of user computers 22, with content provider 26, and is allocated a content posting user webpage of website 25 as part of this content posting account. Each business user also has a social networking account, accessible via the respective one of user computers 22, with social networking service 31, and is allocated a social networking user webpage of website 30 as part of the social networking account. Content provider 26 serves content posting webpage 27 of website 25, and social networking service 31 serves social networking webpage 32 of website 30. For ease of the ensuing discussion, the invention is discussed in connection with one user computer, user computer 22A of a business user, connected to websites 25 and 30 via Internet 20, with the understanding that the ensuing discussion of the invention is the same for every user computer using websites 25 and 30 according to this disclosure.

The business user, the computer user of user computer 22A, has a content posting account 29 with content provider 26. Content posting account 29, accessible via user computer 22A, is allocated content posting user webpage 27A of website 25. The business user also has a social networking account 34 with social networking service 31. Social networking account 34, accessible via user computer 22A, is assigned social networking user webpage 32A of website 30. Reference numeral 27A denotes the term "content posting user webpage" of website 25, with the understanding that the term "content posting user webpage" associated with reference numeral 27A is used as a matter of convention and can be a single content posting user webpage of website 25 or a plurality of content posting user webpages of website 25. Reference numeral 32A denotes a "social networking user webpage" of website 30, with the understanding that the term "social networking user webpage" associated with reference numeral 32A is used as a matter of convention and can be a single social networking webpage of website 30 or a plurality of social networking user webpages of website 30.

Access to user webpage 27A by the business owner from user computer 22A is username/password protected in accordance with known techniques. Access to social networking user webpage 32A by the business user from user computer 22A is username/password protected in accordance with known techniques. Like all social networking user webpages 32 of website 30 of social networking service 31, social networking user webpage 32A is used by the business user to share content, such as posts. Like all user webpages 27, user webpage 27A is used to access and send posts from content provider 26 to webpage 32A of website 30 of social networking service 31.

Social networking service 31 is an existing online platform (e.g., Facebook, Twitter, LinkedIn, etc.) used by online users, including the computer user of user computer 22A, to build social networks or social relations among people who share interests, activities, backgrounds, or real-life connections through user webpages 32. The social networking account 34 of the business user is a user profile created by the business user through website 30 from user computer 22A by filling out and submitting the online signup form or user profile through website 30. Conventionally, the online signup form or user profile includes graphical control elements, text fields and the like, used by the business user from user computer 22A to enter the business user's information (e.g., name, address, email address(es), phone number(s), etc.), chosen login credentials (e.g., username and password) to access social networking account 34, user preferences, and the like, into the online signup form or user provide and then submit the completed form/profile from which social networking account 34 is generated.

Similarly, the content posting account 29 of the business user is a user profile created by the business user through website 25 from user computer 22A by filling out and submitting the online signup form or user profile through website 25. Conventionally, the online signup form or user profile accessed through website 25 includes graphical control elements, text fields and the like, used by the business user from user computer 22A to enter the business user's information (e.g., name, address, email address(es), phone number(s), etc.), chosen login credentials (e.g., username and password) to access content posting account 29, social networking service 31 to associate with content posting account 29, user preferences, and the like, into the online signup form or user provide and then submit the completed form/profile from which content posting account 29 is generated. A dropdown menu or other graphical user interface is incorporated into the form/profile that is used by the business user operating user computer 22A to select social networking service 31 to associate with content posting account 29, and to enter the credentials used to access the business user's social networking account 34.

After social networking account 34 content posting account 29 are activated, from user computer 22A the business user accesses content posting website 29 via Internet 20 through an Internet address (i.e., a Uniform recourse locator or "URL") and logs in to content posting account 29 to access webpage 27A, browse through posts 45, and post selected posts 45 to webpage 32A of website 30. To log in to content posting account 27, using user computer 22A the business user accesses website 25 via its designated web address, and presents the chosen login credentials at a login screen to obtain access to webpage 27A allocated to content posting account 29. In response to logging in to content posting account 29, computer server 40 is programmed retrieve the social networking service 31 login credentials previously supplied by the business user and concurrently log in to social networking account 34 through website 30 of social networking service 31 for allowing posts 45 to be shared/posted on webpage 32A of the business user's social networking account 34 from webpage 27A of the business user's content posting account 29.

Figure 2:
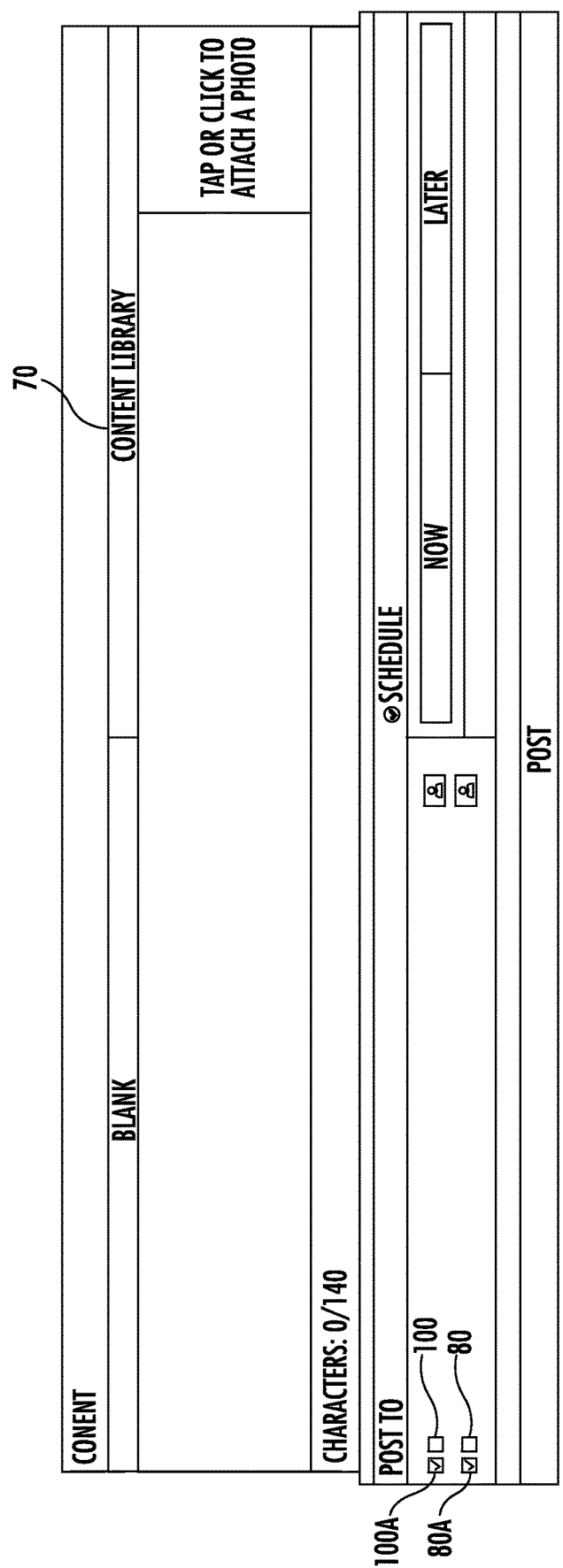
Figure 6:
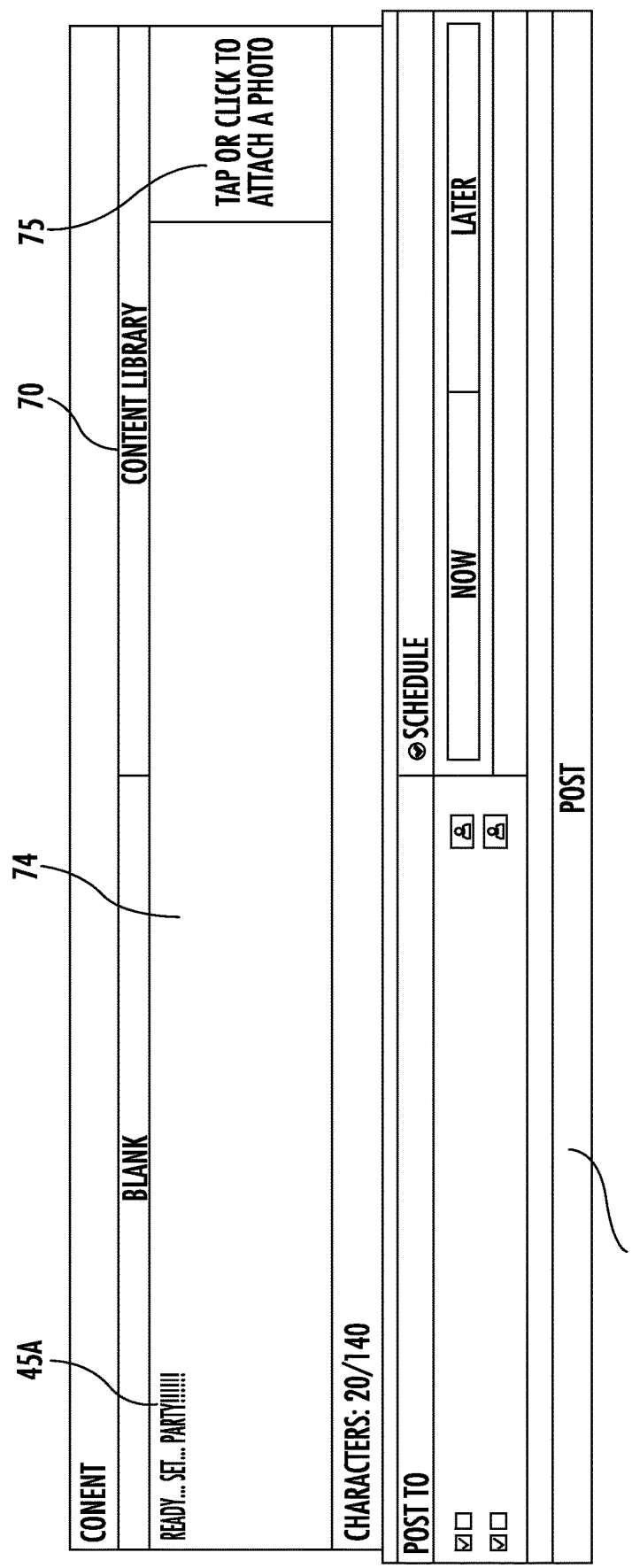
Figure 7:
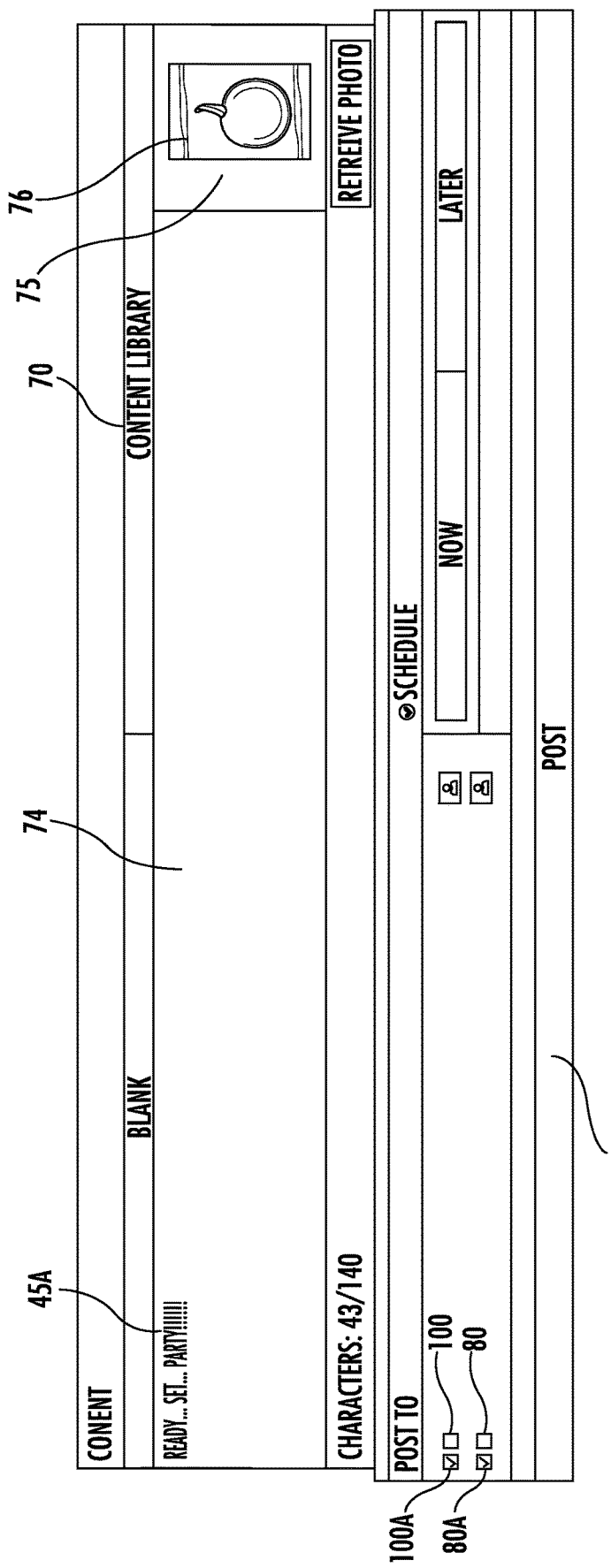

FIGS. 2-7 are webpage 27A screen captures illustrating procedures of a content posting process from webpage 27A of website 25 to webpage 32A of website 30. Screen capture 60 in FIG. 2 is an example of a "home" page of webpage 27A. The business user is taken to the home page in FIG. 2 after logging in to content posting account 29 from user computer 22A, or by logging in to content posting account 29 from user computer 22A and navigating to the home page. In FIG. 2, the home page includes graphical user interfaces, icons, buttons, and visual indicators, one or more texted-based interfaces, and internal links, including internal site links, and external links associated with the graphical user interfaces. Internal and external links are types of hyperlinks. Links are "external" or "internal" depending on their target. A link to a page outside of webpage 27A of website 25, such as to website 30 of social networking service 31, is external, whereas a link that points at another section or page of webpage 27A of website 25 is internal. After the business owner logs in to the content posting account 29 to access webpage 27A, the webpage represented by the screen captures in FIGS. 2-7 are selectively displayed on user computer 22A in response to signals received by computer server 40 from user computer 22A. Computer server 40 is programmed to automatically carry out specific functions in response to signals it receives from a web browser of user computer 22A according to the discussion below. Signals from user computer 22A to computer server 40 are initiated with a mouse or other input device of user computer 22A.

To initiate a post, from the home page in FIG. 2 the business user clicks on the displayed content library link 70, an internal link, which brings up the content library page in FIG. 3, which displays posts 45 that can be selected for posting. Each post 45 is content to be posted, text in this example, of content library 44 of computer store 41. Each post 45 is an advertisement, enticement, or the like that serves a commercial purpose for creating a commercial opportunity both for visitors visiting webpage 32A of website 30 of social networking service 31 from visitor computers, and for the business user associated with content posting account 29. The commercial purpose of each post 45 is to promote visitors visiting webpage 32A from visitor computers to engage in commerce with the business user of webpage 32A. The commercial opportunity for visitors visiting webpage 32A from visitor computers is to purchase goods/services from the business user associated with webpage 32A, and the commercial opportunity for the business user associated with webpage 32A is to sell goods/services to visitors visiting webpage 32A from visitor computers. The content of content library 44, housed in computer store 41 referenced in FIG. 1, is categorized in this example. In this example, the categories of posts are accessed from drop-down menu 71. Drop-down menu 71 is a graphical control element. When drop-down menu 71 is unclicked or inactive, it displays a single category as in FIG. 3, which is a "General" category corresponding to generic posts 45, namely, posts 45 not necessarily directed to a specific field. When clicked and activated, drop-down menu 71 displays a drop-down menu of categories of content library 44 as in FIG. 4 from which user selections can be made. Content library 44 contains posts 45 for each category. In this example there are twelve categories, including general, quotes, spiritual, restaurant, club, automotive, service, retail, transportation, construction, real estate, and manufacturing, and other, additional or different categories can be used. Posts 45 relate to each category. The posts 45 in the restaurant category contain information, advertising, an enticement, or the like, related to the restaurant industry, the posts 45 in the club category contain information, advertising, an enticement, or the like, related to the club industry, the posts in the automotive category contain information, advertising, an enticement, or the like, related to the automotive sales/service industry, and so on. This allows business users to select categories for accessing posts 45 specific to their areas of business. The posts in each category are different from one another.

In this example, the business user is a restaurant and selects the restaurant category of drop-down menu 71 in FIG. 4. In response, computer server 40 automatically retrieves from computer store 41 the posts 45 of the restaurant category, and resets the content library page to present a list of posts 45 in the restaurant category as shown in FIG. 5. The posts in FIG. 5 are related to the restaurant industry, and are different from one another. Using user computer 22A in FIG. 1 the business user can browse through the restaurant listing of posts 45 in FIG. 5 and select one of the posts 45 for posting, such as post 45A "READY . . . SET . . . PARTY!!!!!!".

Each post 45 is associated with a post select control 46 (FIG. 1), an internal link. To choose one of posts 45 for posting, the business user selects a selected post 45A, which activates post select control 46 of the selected post 45A. Computer server 40 is programmed to receive from the web browser of user computer 22A a signal indicating activation of post select control 46 (FIG. 1) of the selected one of the posts 45, post 45A in FIG. 5 in this example, displayed by webpage 27A, automatically link the selected post 45A to external posting link 50, automatically link the posting link 50 to social networking account 34, and bring up the home page in FIG. 6 displaying the selected post 45A in a customize text box 74 and posting link 50. Post select control 46 is selected in response to selecting the selected post 45A in FIG. 5. The content of selected post 45A in customize text box 74 in FIG. 6 can be posted to webpage 32A (FIG. 1) as-is by clicking the displayed posting link 50 in FIG. 6, or edited or otherwise modified by the business user via user computer 22A prior to posting. It is to be noted that in some of the posts of content library 44 selected information, such as "business name", is located in brackets "( )", requiring the business user to fill in the required information, such as the business user's business name as is the case in a particular embodiment, and then delete the brackets before posting the edited post. To post the selected post 45A as-is from webpage 27A of website 25 of content provider 26 to webpage 32A of website 30 of social networking service 31, with a mouse or other input device of user computer 22A the business user clicks on the displayed posting link 50 in FIG. 6, and computer server 40 is programmed to receive from the web browser of the business user using user computer 22A a signal indicating activation of posting link 50, and automatically issue the selected post 45A to webpage 32A for posting thereon. This posting process is repeated for each post 45 posted from webpage 27A to webpage 32A. To customize the selected post 45A as in FIG. 7, with a mouse or other input device of user computer 22A the business user can click on text box 74 in FIG. 6, customize the text of the selected post 45A and/or, for example, upload a photograph or other content to the selected post 45A by clicking on "attach a photo link" window, denoted at 75 in FIG. 6 to the right of text box 74. In response to selecting window 75, a photograph from a stock library or from the user's computer, can be loaded into window 75 in FIG. 7 for posting concurrently with selected post 45A. To post the modified selected post 45A from webpage 27A of website 25 of content provider 26 to webpage 32A of website 30 of social networking service 31, with a mouse or other input device of user computer 22A the business user clicks on the displayed posting link 50 in FIG. 7, and computer server 40 is programmed to receive from the web browser of the business user using user computer 22A a signal indicating activation of posting link 50, and automatically issue the selected post 45A to webpage 32A for posting thereon. This posting process for modified posts is repeated for each post 45 posted from webpage 27A to webpage 32A.

In the example of the system discussed above, webpage 32A of networking service 31 is associated with webpage 27A of content provider 26. On the home page in FIG. 2, there is a displayed social media link 80 that brings up webpage 27A of social networking service 31 when selected. To point posting link 50 to webpage 32A for posting content to webpage 32A in response to selecting posting link 50, a selectable dialog box 80A associated with link 80 can be selected, and is shown as it would be selected in FIG. 2. The display of social media link 80 and dialog box 80A associated with social media link 80 lets the business user know that social networking service 31 is associated with webpage 27A for allowing content posting from webpage 27A to webpage 32A.

Additional webpages 32A of different social networking services can be associated with webpage 27A of content in alternate embodiments for allowing content posting from webpage 27A of website 25 to multiple webpages, simultaneously or individually, of different websites of different social networking services. In creating content posting account 29, or by updating content posting account 29, the business user can associate two or more webpages of other social networking services with webpage 27A of website 25 of content provider 26.

As a matter of example, in FIG. 1, in addition to social networking account 34 of social networking service 31, the business user also has a social networking account 90 with social networking service 91 having website 93 of webpages 92. Social networking account 90, accessible via user computer 22A, is assigned social networking user webpage 92A of website 93 of social networking service 91. Webpage 92A of networking service 91 is associated with webpage 27A of content provider 26. On the home page in FIG. 2, there is a displayed social media link 100 that brings up webpage 92A of social networking service 91 when selected. To point posting link 50 to webpage 92A for posting content to webpage 92A in response to selecting posting link 50, a selectable dialog box 100A associated with link 100 can be selected, and is shown as it would be selected in FIG. 2. The display of social media link 100 and dialog box 100A associated with social media link 100 lets the business user know that social networking service 91 is associated with webpage 27A.

In this example, computer server 40 is coupled to computer store 41 and for each of the posts 45 is programmed to receive from the web browser of user the computer user, user computer 22A used by the business user, a signal indicating activation of the post select control 46 of a selected one of the posts 45 displayed by webpage 27A as discussed above, automatically link the selected one of the posts 45 to external posting link 50, receive from the web browser of the computer user a signal indicating activation of external posting link 50, and automatically issue the selected one of the posts 45 to the different web pages of the websites of the respective social networking services associated with webpage 27A. Through the posting process disclosed herein, a post can be shared to a selected webpage of a social networking service or to multiple webpages of different social networking services simultaneously. This posting process is repeated for each post 45 posted from webpage 27A to multiple webpages of different social networking services.

To initiate a post to webpage 32A and webpage 92A, from the home page in FIG. 2 the business user selects dialog boxes 80A and 100A, and clicks on the displayed content library link 70, which brings up the content library page in FIG. 3, which displays posts 45 that can be selected for posting. FIG. 3 displays generic posts 45 corresponding to the "General" category corresponding to generic posts 45, again, posts 45 not necessarily directed to a specific field. When clicked and activated by the business user from user computer 22A in FIG. 1, drop-down menu 71 displays a drop-down menu of categories of content library 44 as in FIG. 4 from which user selections can be made. In this example, using user computer 22A in FIG. 1 the business user selects the restaurant category in FIG. 5 for displaying posts 45 corresponding to the restaurant category, and selects post 45A in FIG. 5 for posting. Computer server 40 is programmed to receive from the web browser of user computer 22A a signal indicating activation of post select control 46 (FIG. 1) of the selected one of the posts 45, post 45A in FIG. 5 in this example, displayed by webpage 27A, automatically link the selected post 45A to external posting link 50, automatically link the posting link 50 to social networking accounts 34 and 90, and bring up the home page in FIG. 6 displaying the selected post 45A in the customize text box 74 and posting link 50. Again, post select control 46 is selected in response to selecting the selected post 45A in FIG. 5. The content of selected post 45A in customize text box 74 in FIG. 6 can be posted to webpages 32A and 92A (FIG. 1) as-is, or modified by the business user via user computer 22A prior to posting as explained above in FIG. 7. Again, some of the posts of content library 44 have selected information located in brackets "( )", requiring the business user to fill in the required information, and then delete the brackets before posting the post. To post the selected post 45A from webpage 27A of website 25 of content provider 26 to webpage 32A of website 30 of social networking service 31 and to webpage 92A of website 93 of social networking service 91, with a mouse or other input device of user computer 22A the business user clicks on the displayed posting link 50 in FIG. 8, and computer server 40 is programmed to receive from the web browser of the business user using user computer 22A a signal indicating activation of posting link 50, and automatically issue the selected post 45A concurrently to webpages 32A and 92A for posting thereon. This posting process is repeated for each post 45 posted from webpage 27A to multiple webpages, which, in this example, are webpages 32A and 92A.

In the preceding example of the system discussed above, there are two different webpages 32A and 92A of two different social networking services 31 and 91 associated with webpage 27A of content provider 26. Dialog boxes 80A and 100A are selected in the example above for concurrent content posting to webpages 32A and 92A of social networking services 31 and 92 associated with website 25 in response to selecting posting link 50 after selecting a selected post for posting as discussed above. To post content on just webpage 32A, dialog box 80A is selected and dialog box 100A is either not selected or deselected. To post content on just webpage 92A, dialog box 100A is selected and dialog box 80A is either not selected or deselected. The posting process is as above in either case, with the difference being that the selected content is posted only to webpage 32A when dialog box 80A is selected and dialog box 100A is either not selected or deselected, and the selected content is posted only to webpage 92A when dialog box 100A is selected and dialog box 80A is either not selected or deselected.

In the example above, the business user is a restaurant and selects the restaurant category of drop-down menu 71 in FIG. 4. In response, computer server 40 automatically retrieves from computer store 41 the posts 45 of the restaurant category, and resets the content library page to present a list of posts 45 in the restaurant category as shown in FIG. 5. Content from other categories in drop-down menu 71 are similarly selected. As a matter of example, FIG. 8 illustrates the club selection from drop-down menu 71 and the corresponding posts 45 for that category, FIG. 9 illustrates the automotive selection from drop-down menu 71 and the corresponding posts 45 for that category, and FIG. 10 illustrates the retail selection from drop-down menu 71 and the corresponding posts 45 for that category. The other categories from drop-down menu 71 are similar.

The invention has been described above with reference to illustrative embodiments. Those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A system, comprising:
   a post and an external posting link displayed on a first user webpage displayed on a user computer; and
   a computer server programmed to receive from the user computer a signal indicating selection, by a user utilizing the user computer, of the post displayed on the first user webpage displayed on the user computer, automatically link the post to the external posting link displayed on the first user webpage displayed on the user computer, receive from the user computer a signal indicating activation, by the user utilizing the user computer, of the external posting link displayed on the first user webpage displayed on the user computer, and, in response, automatically issue the post to a second user webpage for posting thereon, the second user webpage different from the first user webpage.

2. The system of claim 1, wherein the second user webpage comprises a user webpage of a social networking service.

3. A method, comprising:
   displaying a post and an external posting link on a first user webpage displayed on a user computer; and
   a computer server programmed to effectuate operations comprising the computer server receiving from the user computer a signal indicating selection, by a user utilizing the user computer, of the post displayed on the first user webpage displayed on the user computer, automatically linking the post to the external posting link displayed on the first user webpage displayed on the user computer, receiving from the user computer a signal indicating activation, by the user utilizing the user computer, of the external posting link displayed on the first user webpage displayed on the user computer, and automatically issuing the post to a second user webpage for posting thereon, the second user webpage different from the first user webpage.

4. The method according to claim 3, wherein the second user webpage comprises a user webpage of a social networking service.

5. A system, comprising:
   a post and an external posting link displayed on a first user webpage displayed on a user computer; and
   a computer server programmed to receive from the user computer a signal indicating selection, by a user utilizing the user computer, of the post displayed on the first user webpage displayed on the user computer, automatically link the post to the external posting link displayed on the first user webpage displayed on the user computer, receive from the user computer a signal indicating activation, by the user utilizing the user computer, of the external posting link displayed on the first user webpage displayed on the user computer, and, in response, automatically issue the post to a plurality of second user webpages for posting thereon, the second user webpages different from each other and the first user webpage.

6. The system of claim 5, wherein each of the second user webpage comprises a user webpage of a social networking service.

7. A method, comprising:
   displaying a post and an external posting link on a first user webpage displayed on a user computer; and
   a computer server programmed to effectuate operations comprising the computer server receiving from the user computer a signal indicating selection, by a user utilizing the user computer, of the post displayed on the first user webpage displayed on the user computer, automatically linking the post to the external posting link displayed on the first user webpage displayed on the user computer, receiving from the user computer a signal indicating activation, by the user utilizing the user computer, of the external posting link displayed on the first user webpage displayed on the user computer, and automatically issuing the post to a plurality of second user webpages for posting thereon, the second user webpages different from each other and the first user webpage.

8. The method according to claim 7, wherein each one of the second user webpages comprises a user webpage of a social networking service.

\* \* \* \* \*